No. 731,813. PATENTED JUNE 23, 1903.
A. PETELER.
FLEXIBLE SHAFT COUPLING.
APPLICATION FILED FEB. 27, 1902.
NO MODEL.
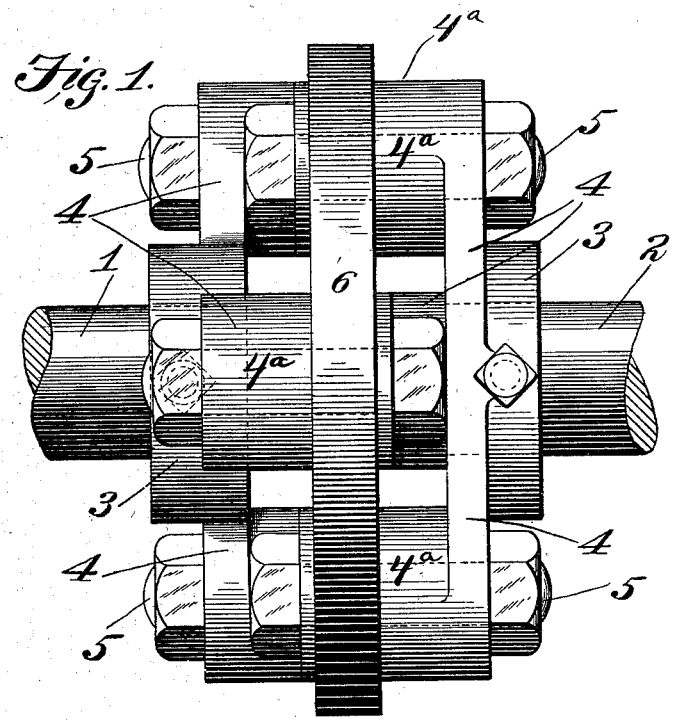
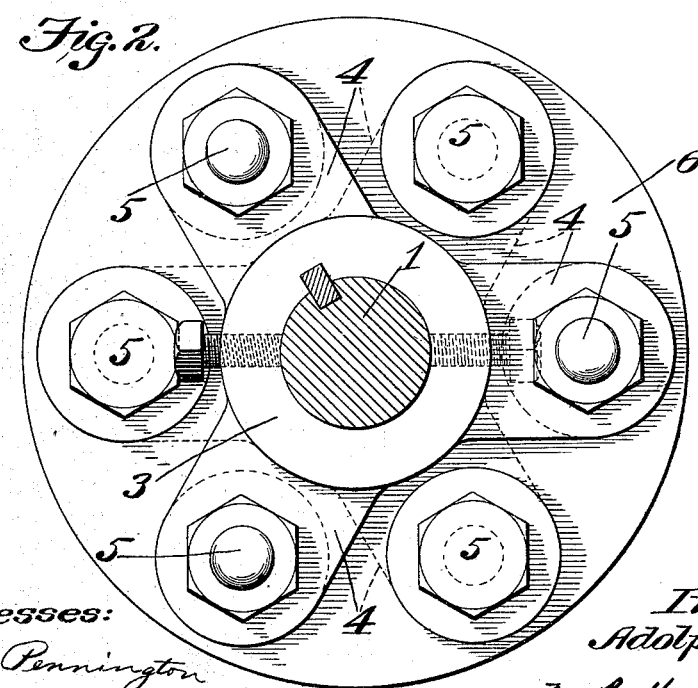
Witnesses:
G. A. Pennington
Ralph M. Ashby
Inventor:
Adolph Peteler,
by Bakewell & Cornwall
Attys.

No. 731,813. Patented June 23, 1903.

UNITED STATES PATENT OFFICE.

ADOLPH PETELER, OF ST. LOUIS, MISSOURI.

FLEXIBLE SHAFT-COUPLING.

SPECIFICATION forming part of Letters Patent No. 731,813, dated June 23, 1903.

Application filed February 27, 1902. Serial No. 95,981. (No model.)

*To all whom it may concern:*

Be it known that I, ADOLPH PETELER, a citizen of the United States, residing at the city of St. Louis, State of Missouri, have invented a certain new and useful Improvement in Flexible Shaft-Couplings, of which the following is a full, clear, and exact description, such as will enable others skilled in the art to which it appertains to make and use the same, reference being had to the accompanying drawings, forming part of this specification, in which—

Figure 1 is a side elevational view of my improved shaft-coupling, and Fig. 2 is an edge elevational view.

This invention relates to a new and useful improvement in flexible shaft-couplings, the object being to simplify the construction of devices of the character described and at the same time cause the driven shaft to be positively rotated while permitting a degree of flexibility in the coupling sufficient to take up variations in the relative positions of the two shafts, which variations may occur in either the driven or driving shaft.

My invention consists in the construction, arrangement, and combination of the several parts, all as will hereinafter be described and afterward pointed out in the claim.

In the drawings, 1 indicates the driving-shaft, and 2 the driven shaft. The ends of these shafts are substantially in axial alinement; but a variation from this position is permitted by my improved coupling without destroying the positive connection between the two shafts. On the ends of the driving and driven shafts are fixed hubs 3, which are provided with radial arms 4, forming spiders, there being three spider-arms shown in the drawings extending from each hub. The outer ends of these spider-arms are perforated for the reception of bolts or other attaching devices 5, by which the arms are secured to a flexible disk 6, at which point said arms are each provided with lateral projections 4ª, which project from the arms to contact with the disk 6, thereby holding it firmly in position between but free from contact with the arms 4, whereby greater torsional play of the ends of the shafts 1 2 is permitted than if said spider-arms were of a continuous straight line on their inner faces and abutted against said disk for their entire length. This disk is preferably made of leather; but there are other materials of which it could be composed. The spider-arms of the driving and of the driven shafts are circumferentially displaced with respect to each other, so that they are connected to the flexible disk at alternate points. Where there are six arms (three on each shaft) said arms are preferably arranged equidistantly around the disk, their points of attachment being sixty degrees apart. It will be understood, however, that two arms could be employed on each shaft or more than three arms.

From the above it will be noted that should either of the shafts be deflected from a straight line the flexible disk will yield to accommodate such movement without destroying the direct positive connection between the shafts and also that the shafts or either of them may be slightly displaced longitudinally without destroying the efficiency of the coupling.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

In a shaft-coupling, the combination of a driving and driven shaft, a collar on each of said shafts, there being integral radial arms projecting from each of said collars and integral perforated lateral extensions on said radial arms, an interposed flexible disk secured between the inner ends of said radial arms and of sufficient diameter to extend beyond the ends thereof, said disk having perforations registering with the perforations in all of said radial arms, and bolts passing through said disk and said perforated extensions and thereby connecting the said disk to all of the said radial arms; substantially as described.

In testimony whereof I hereunto affix my signature, in the presence of two witnesses, this 24th day of February, 1902.

ADOLPH PETELER.

Witnesses:
GEORGE BAKEWELL,
G. A. PENNINGTON.